United States Patent
Naidu et al.

(10) Patent No.: US 10,047,652 B2
(45) Date of Patent: Aug. 14, 2018

(54) METHOD AND SYSTEM FOR REMOVING SULFUR FROM A LEAN NOX TRAP

(71) Applicant: FORD GLOBAL TECHNOLOGIES, LLC, Dearborn, MI (US)

(72) Inventors: Paspuleti Ashish Kumar Naidu, Basildon Essex (GB); James Wright, Wanstead (GB); Peter George Brittle, Romford (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 56 days.

(21) Appl. No.: 15/216,188

(22) Filed: Jul. 21, 2016

(65) Prior Publication Data

US 2017/0022863 A1 Jan. 26, 2017

(30) Foreign Application Priority Data

Jul. 22, 2015 (GB) .................................. 1512890.3

(51) Int. Cl.
| | |
|---|---|
| *F01N 3/00* | (2006.01) |
| *F01N 3/08* | (2006.01) |
| *H02J 7/32* | (2006.01) |
| *F01N 3/20* | (2006.01) |
| *F02D 41/02* | (2006.01) |
| *F02D 41/14* | (2006.01) |

(52) U.S. Cl.
CPC ......... *F01N 3/0885* (2013.01); *F01N 3/2006* (2013.01); *F02D 41/028* (2013.01); *H02J 7/32* (2013.01); *F01N 2430/06* (2013.01); *F01N 2590/11* (2013.01); *F01N 2900/104* (2013.01); *F02D 41/1444* (2013.01); *F02D 2041/026* (2013.01); *F02D 2200/502* (2013.01); *Y02T 10/26* (2013.01)

(58) Field of Classification Search
USPC ......... 60/274, 275, 284, 285, 297, 300, 301; 180/65.2, 65.3, 65.4
See application file for complete search history.

(56) References Cited

U.S. PATENT DOCUMENTS

| | | | | |
|---|---|---|---|---|
| 6,672,050 B2 * | 1/2004 | Murata | ................. | B60K 6/485 180/65.26 |
| 7,110,904 B2 * | 9/2006 | Lippa | .................. | B60H 1/3208 60/277 |
| 7,621,120 B2 | 11/2009 | Matheaus et al. | | |

(Continued)

FOREIGN PATENT DOCUMENTS

| | | |
|---|---|---|
| EP | 1013903 A2 | 6/2000 |
| GB | 2498534 A | 7/2013 |
| GB | 2500923 A | 9/2013 |

*Primary Examiner* — Binh Q Tran
(74) *Attorney, Agent, or Firm* — David B. Kelley; Brooks Kushman P.C.

(57) ABSTRACT

A method of removing sulfur from a lean NOx trap of a mild hybrid vehicle while the vehicle is stationary is disclosed, the method comprising connecting an electrical system of the vehicle to a large capacity external battery, operating an integrated starter generator driven by an engine of the vehicle as a generator to load the engine thereby allowing the engine to be operated at a higher torque level and rich of stoichiometric and storing the electrical energy produced by the integrated starter generator in the large capacity battery during the time period required for the removal of sulfur from the lean NOx trap.

11 Claims, 1 Drawing Sheet

(56) References Cited

U.S. PATENT DOCUMENTS

| | | | |
|---|---|---|---|
| 8,914,172 B2* | 12/2014 | Shiino | B60W 20/15 |
| | | | 701/22 |
| 9,650,034 B2* | 5/2017 | Kim | B60W 20/14 |
| 2002/0038654 A1* | 4/2002 | Sasaki | B60K 6/485 |
| | | | 123/568.11 |
| 2005/0034451 A1* | 2/2005 | Miyashita | B60K 6/48 |
| | | | 60/300 |
| 2010/0043404 A1 | 2/2010 | Hebbale et al. | |
| 2010/0063659 A1* | 3/2010 | Ogiso | B60K 6/48 |
| | | | 701/22 |
| 2012/0079822 A1 | 4/2012 | Yacoub | |
| 2012/0209466 A1 | 8/2012 | Ogiso | |
| 2014/0102079 A1 | 4/2014 | Linzen et al. | |

* cited by examiner

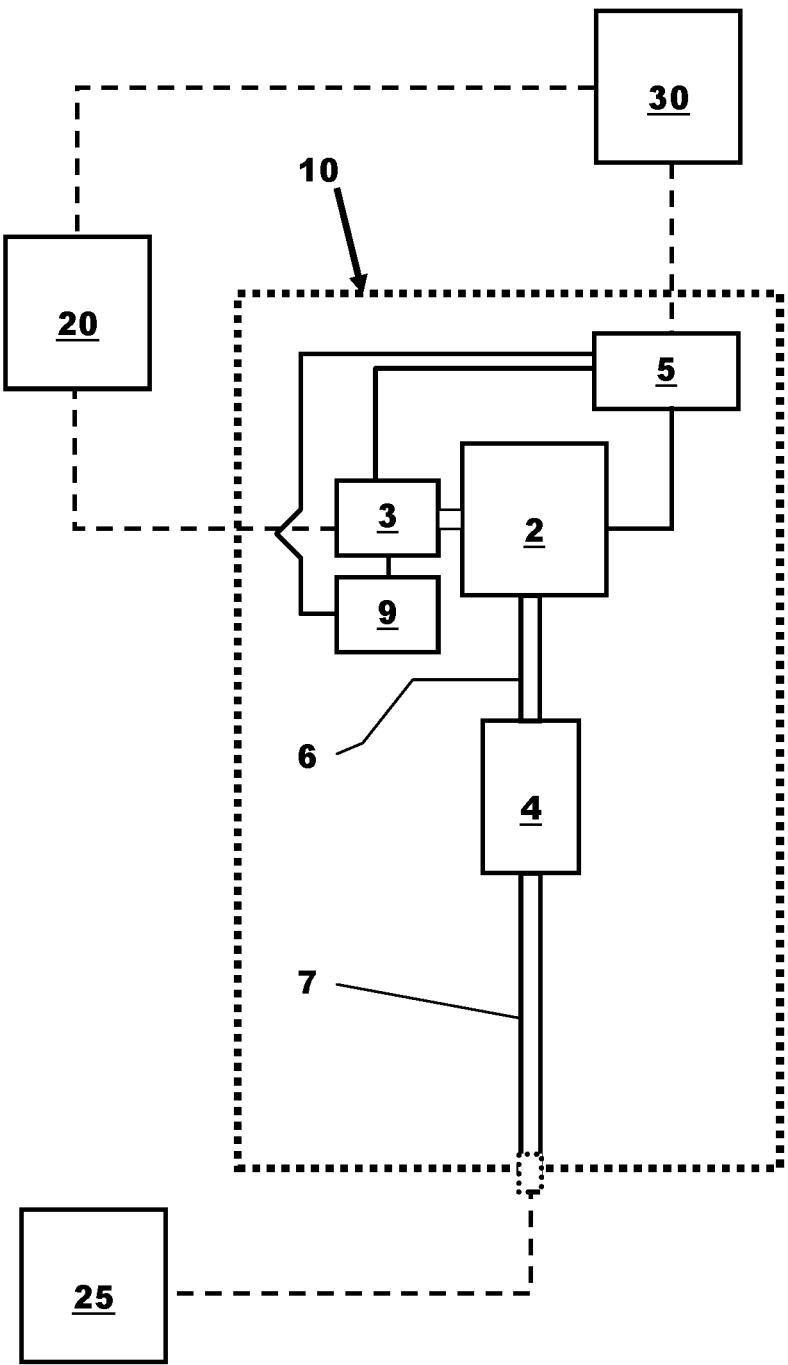

METHOD AND SYSTEM FOR REMOVING SULFUR FROM A LEAN NOX TRAP

CROSS-REFERENCE TO RELATED APPLICATIONS

This application claims foreign priority benefits under 35 U.S.C. § 119(a)-(d) to GB 1512890.3 filed Jul. 22, 2015, which is hereby incorporated by reference in its entirety.

TECHNICAL FIELD

The present invention relates to the removal of sulfur contamination from a lean NOx trap of a motor vehicle and in particular to a method for removing sulfur contamination when the vehicle is stationary.

BACKGROUND

It is known to provide a motor vehicle with a lean NOx trap (LNT) aftertreatment system to control the emission of NOx to the environment. It is further known to provide a motor vehicle with an electric machine connected to the engine such as an integrated starter generator that can be used to provide a short torque boost to the engine during vehicle acceleration events and stop start events. Such a vehicle is often referred to as being a Mild Hybrid Electric Vehicle (MHEV) because electrical power can be used to assist the engine but is not used to power the vehicle on its own.

It is further known that during use the LNT will gradually become contaminated with sulfur which is a by-product of combustion. The effect of such sulfur contamination is that active sites within the LNT are reduced and can no longer trap NOx as the contamination increases. Ultimately, such contamination may result in the vehicle to which the LNT is fitted no longer being compliant with emissions standards.

When a vehicle is identified as an emissions failure it is required to be taken to a service provider (garage) to be repaired. However, the service provider will not normally have the ability to provide sufficient load to the engine when the vehicle is in the workshop to remove the sulfur from the LNT. This is because to remove the sulfur requires the engine to be run rich of stoichiometric, which is achievable when a high torque demand is being met by the engine.

One solution to this problem is for the service provider to drive the vehicle on a defined drive cycle to provide sufficient torque to enable a rich exhaust gas to be produced. However, this is often problematic as traffic, road signals and other uncontrolled events can prevent the drive cycle being successfully completed thereby resulting in a failure to remove all the sulfur from the LNT.

It is an object of the present invention to provide a method of removing sulfur from a lean NOx trap that overcomes the problems associated with the prior art.

SUMMARY

According to the present invention there is provided a method of removing sulfur from a lean NOx trap arranged to receive a flow of exhaust gas from an engine of a vehicle having an electric machine driven by the engine when the motor vehicle is stationary wherein the method comprises selecting a neutral gear in a transmission of the vehicle, operating the electric machine as a generator so as to load the engine, increasing a torque demand to the engine so as to produce an exhaust gas flow to the lean NOx trap that is rich of stoichiometric and using an electrical load to absorb the electric energy produced by the electrical machine.

The method may further comprise connecting an electrical system of the vehicle to an external load and using the external electrical load to absorb the electric energy produced by the electrical machine.

The external electrical load may be a battery having a capacity sufficient to absorb the electrical energy produced by the sulfur removal process.

The method may further comprise connecting the vehicle to an external electronic controller arranged to control the operation of the electric machine during the sulfur removal process.

Alternatively, the method may further comprise connecting the vehicle to an external electronic controller arranged to control the torque demand to the engine during the sulfur removal process.

As yet another alternative, the method may further comprise connecting the vehicle to an external electronic controller arranged to control the operation of the electric machine and the torque demand to the engine during the sulfur removal process.

The method may further comprise monitoring the composition of the exhaust gas flow downstream from the lean NOx trap and using the monitored gas flow composition to decide when to end the sulfur removal process.

Alternatively, the method may further comprise using a model of sulfur removal to decide when to end the sulfur removal process.

The method may further comprise carrying out the sulfur process in response to a warning provided by an exhaust gas monitoring system of the motor vehicle.

The load produced by the electric machine may be varied during the period in which sulfur is being removed from the lean NOx trap so as to produce alternating rich and non-rich exhaust gas flows.

The exhaust gas flow may alternate between rich of stoichiometric and lean of stoichiometric.

The vehicle may be a mild hybrid vehicle.

The electric machine may be an integrated starter generator.

BRIEF DESCRIPTION OF THE DRAWINGS

FIG. 1 is a schematic view of a mild hybrid electric vehicle.

DETAILED DESCRIPTION

As required, detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The vehicle 10 has a diesel engine 2 drivingly connected to an electric machine in the form of an integrated starter-generator 3 which in this case is a belt integrated starter-generator.

Exhaust gas from the engine 2 flows via an exhaust passage 6 to an aftertreatment device in the form of a lean NOx trap 4 and from the lean NOx trap 4 out to atmosphere via a downstream exhaust passage 7. The exhaust passages 6, 7 form in combination and exhaust system for the engine 2.

The vehicle 10 also has a central electronic controller 5 which in the case of this example controls both the operation of the engine 2 and the operation of the integrated starter-generator 3. It will be appreciated that separate electronic controllers could be used for the engine 2 and the integrated starter generator 3 and that the present invention is not limited to use with an electronic architecture having a single electronic controller.

The integrated starter-generator 3 is operatively connected to a battery 9. The battery 9 is arranged to be charged by the integrated starter-generator 3 when the integrated starter-generator 3 is operating as a generator and to provide electrical power to the integrated starter-generator 3 when the integrated starter-generator 3 is operating as a motor to provide a torque boost to the vehicle 10. Unlike a full hybrid or plug-in hybrid vehicle the integrated starter-generator 3 is not used to drive the vehicle on its own, but is used to provide a torque boost to the engine 2 and the storage capacity of the battery 9 is therefore considerably less than would be required if the integrated starter-generator 3 were to be required to provide tractive power to the vehicle 10 for any period of time.

As referred to previously a problem with a lean NOx trap (LNT) is that during operation, it is exposed to sulfur in the exhaust gas from the engine 2. The sulfur in the exhaust gas causes aging of the LNT and also reduces the number of available NOx storage sites in the LNT, so that eventually the LNT will have deteriorated to such an extent that a sulfur removing process (also known as "de-sulfurisation" or "deSOx") is needed in order to purge the adsorbed sulfur compounds from the LNT.

In order to carry out such a deSOx process, the engine is operated so as to provide a relatively rich exhaust gas mixture, that is to say, the mixture has a surplus of fuel compared to the amount of oxygen that is available for the combustion, during a certain time period. Also, the deSOx process demands an increased exhaust gas temperature such as, for example, an exhaust gas temperature of at least 600° C. In order to produce such a combination it is required to operate the engine at relatively high load. If a rich exhaust gas mixture and an increased exhaust gas temperature can be provided for a significant time period, any sulfur compounds trapped in the LNT will be removed from the LNT and flow out via the exhaust system of the vehicle.

As previously discussed a deSOx requires the engine 2 to be operated so as to produce an exhaust gas mixture that is rich of stoichiometric with an increased exhaust gas temperature of approximately 600-700° C. and, during normal running of the vehicle 10, the opportunities for such engine running may be limited particularly if the vehicle is operating primarily in a city or town environment where the opportunities to use a high level of torque for any significant length of time are very limited.

One way in which it is possible to produce the required torque from an engine during normal use is to use the integrated motor-generator as a generator which provides a braking load on the engine thereby allowing the torque output from the engine to be increased without increasing the speed or acceleration of the vehicle. However, in order to achieve this aim, the electrical energy generated by the integrated starter-generator has to be dissipated in some manner. This could be done by deliberately discharging a battery of the vehicle and then using the electrical energy generated by the integrated starter-generator during the deSOx to recharge the battery.

This technique is practical for use with a full hybrid vehicle or a plug-in hybrid vehicle because the batteries used for such vehicles have a very high storage capacity.

However, in the case of a mild hybrid vehicle such as the vehicle 10 the storage capacity of the battery 9 is relatively small and is insufficient to permit the use of the integrated motor-generator 3 as a generator for a sufficient period of time to carry out a full deSOx of the LNT 4.

Therefore in accordance with the present invention there is provided a method that overcomes the problems associated with carrying out a deSOx particularly if the vehicle has limited battery capacity.

The vehicle 10 is fitted with an exhaust gas monitoring system having several sensors (not shown) to monitor the emissions from the engine 2. These sensors are used to monitor the composition of the exhaust gas flow downstream from the LNT 4 and upstream from the LNT 4. In the case of this example, the difference between these measurements is used to decide when to start and when end the deSOx process.

When the signals from these sensors or, as an alternative, a model of LNT degradation over time indicates that a de-SOx is required and in some cases when it is also established that the operating cycle of the vehicle 10 has been unsuitable for carrying out such a deSOx, a user is alerted of this fact by either the illumination of a light or via an alpha-numeric message. In some cases a message could be sent to a service provider that the vehicle needs attention and the service provider could then contact the user to arrange a convenient date for servicing the vehicle 10. Irrespective of the type of warning device used, a deSOx is normally carried out in response to the warning and a user will take their vehicle to an approved service provider.

When the vehicle 10 is in the workshop of the service provider and is stationary, a service representative (mechanic) carries out numerous steps forming the method according to embodiments of the present invention.

Firstly, the vehicle 10 is connected to a number of external devices required to perform the deSOx.

A first one of these external devices is an external load such as a large capacity battery 20 that is connected to a power side of an electrical system of the vehicle 10. The large capacity battery 20 is discharged before use to ensure that it has sufficient capacity for use in removing sulfur from the LNT 4. It will be appreciated that the present invention is not limited to the use of a large capacity battery any external load capable of absorbing the electric energy produced by the integrated starter-generator 3 during the deSOx process could be used. It will further be appreciated that the battery 9 could be disconnected or isolated from the integrated starter-generator 3 to prevent it from being overcharged during the deSOx or the external load could be connected in parallel such as when a vehicle is being jump started.

A second one of these external devices is an external electronic controller 30 arranged to control the operation of the integrated starter generator 3 during the deSOx process. This can be achieved by connecting the external controller to an electronic system of the vehicle 10 such as an integrated starter-generator controller forming part of the electronic controller 5.

A third one of these external devices is an external electronic controller 30 arranged to control the torque demand to the engine 2 during the deSOx process. This can be achieved by connecting the external controller 30 to an electronic system of the vehicle 10 such as an engine management controller forming part of the electronic controller 5.

In the case of the example shown in FIG. 1, the external electronic controller 30 is arranged to control both the operation of the integrated starter-generator 3 and the torque demand to the engine 2 during the deSOx process.

A fourth one of these external devices is an exhaust gas extraction system 25 used to transfer exhaust gas from the downstream exhaust passage 7 to atmosphere during the deSOx.

To start the deSOx process the service representative starts the engine 2 and places a transmission (not shown) of the vehicle 10 into a neutral gear.

In the case of this example the deSOx process is an automatic one, the service representative starts a pre-programmed routine provided on the external electronic controller 30. The external controller 30 is arranged to operate the integrated starter-generator 3 as a generator so as to load the engine 2 and increases a torque demand to the engine 2 so as to produce an exhaust gas flow to the LNT 4 that is rich of stoichiometric. The connected external load in the form of the large capacity battery 20 is used to absorb the electric energy produced by the integrated starter-generator 3.

The external electronic controller 30 is arranged to maintain the application of the load on the engine 2 for a period of time sufficient to remove the sulfur from the LNT 4. This period of time can be based upon measurements of exhaust gas composition, a set period of time or be based on a model of predicted sulfur removal. It will be appreciated that a measurement of the temperature of the LNT 4 from one or more temperature sensors may be provided to the external electronic controller 30 to assist the external controller 30 in achieving the required temperature for the deSOx.

When it has been determined that the deSOx process is complete, the external electronic controller 30 is arranged to reduce the torque demand to the engine 2 and reduce the load applied by the integrated starter-generator 3 until the engine 2 reaches an idle state. The external electronic controller 30 may provide a message to the service representative that the deSOx is complete.

After completion of the deSOx, the service representative switches off the engine 2 and will disconnect the large capacity battery 20, the exhaust gas extraction system 25 and the external electronic controller 30 from the vehicle 10. The process is then complete.

In an alternative deSOx method, no external electronic controller is used to control the deSOx. In the case of such an embodiment the vehicle 10 is provided with a human machine interface that can be used by the service representative to switch the integrated starter-generator 3 into a generator mode irrespective of the charging requirements of the battery 9 which as previously mentioned is normally disconnected or isolated from the integrated starter-generator 3.

As before the vehicle 10 is placed in a neutral gear and the large capacity battery 20 and the exhaust gas extraction system 25 are connected prior to starting the deSOx. The service representative manually controls the torque demand to the engine 2 by depressing an accelerator pedal of the vehicle 10 so as produce a required engine speed. A count down timer can be provided on the vehicle 10 or some other means is used to gauge the time that the service representative continues with the deSOx. When the deSOx is complete, the service representative releases the accelerator pedal, switches control of the integrated starter-generator 3 back to a normal mode of operation using the human machine interface and disconnect the large capacity battery 20 and the exhaust gas extraction system 25 from the vehicle 10. The battery 9 is then reconnected if it was originally disconnected. The method is then complete.

In another alternative deSOx method, no external electronic controller is used to control the deSOx. In the case of this embodiment the electronic controller 5 of the vehicle 10 is provided with a deSOx routine that can be selected by a service representative. The deSOx routine automatically switches the integrated starter-generator 3 into a generator mode irrespective of the charging requirements of the battery 9. Either the battery 9 is disconnected and an external load such as the load 20, which can be a large capacity battery or any other device able to dissipate the electrical energy produced by the integrated starter-generator 3, is connected in its place or the external load 20 is connected in parallel with the battery 9 as is done when jump starting a motor vehicle.

As before the vehicle 10 is placed in a neutral gear and the external load and an exhaust gas extraction system such as the exhaust gas extraction system 25 are connected prior to starting the deSOx. The service representative starts the routine on the electronic controller 5 which can be done via an external diagnostic device connected to the vehicle 10 or via a human machine interface forming part of the vehicle 10 and the routine automatically controls the torque demand to the engine 2 and the operation of the integrated starter generator 3 so as produce the required conditions for the deSOx.

When the deSOx is complete, the service representative returns operation of the electronic controller 5 to a normal mode of operation, disconnects the external load 20 and disconnects the exhaust gas extraction system 25 from the vehicle 10. The battery 9 is then reconnected if it was originally disconnected.

It will be appreciated that the external load could be used to discharge the battery of the vehicle prior to starting the deSOx and then the integrated starter-generator could either recharge the vehicle battery during the deSOx or the vehicle battery could be used in combination with an external load or battery during the deSOx to absorb the electrical energy produced by the integrated starter generator.

It will be further appreciated that during the deSOx the composition of the exhaust gas flowing to the lean NOx trap could be varied between rich of stoichiometric and lean of stoichiometric by varying the load applied by the electric machine. That is to say, the electric machine could be switched between a generator mode and a non-generator mode or the load applied to the electric machine could be varied between maximum and minimum levels. The maximum level is used to produce the rich exhaust gas mixture and the minimum level is used to produce the lean exhaust gas mixture. For example and without limitation, every 5 to 10 seconds the mode of operation of the electric machine could be switched between the generator mode and an off mode. The total required rich time for a deSOx is in the order of 50 to 150 seconds depending upon the amount of Sulfur to be removed, the exhaust gas mixture provided and the temperature present in the lean NOx trap.

Although the present invention has been described with reference to a particularly advantageous use for a mild hybrid electric vehicle, it will be appreciated that it could be applied to other types of vehicle having a LNT that requires to periodically purged of sulfur provided the vehicle has an electric machine having the capacity to load the engine sufficiently to produce the required rich mixture.

It will be appreciated by those skilled in the art that although the present invention has been described by way of example with reference to one or more embodiments it is not limited to the disclosed embodiments and that alternative embodiments could be constructed without departing from the scope of the present invention as defined by the appended claims.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A hybrid electric vehicle apparatus comprising:
   a transmission;
   an engine with a torque demand;
   a lean NOx trap for receiving a flow of exhaust gas from the engine;
   an electrical machine driven by the engine when the vehicle is stationary;
   a controller configured to select a neutral gear of the transmission, operate the electrical machine as a generator to load the engine when the vehicle is stationary, and control the torque demand to produce a stoichiometrically rich exhaust gas flow to the lean NOx trap to remove sulfur from the trap; and
   an external electrical load for absorbing electrical energy produced by the electrical machine, wherein the external electrical load is configured to connect to an electrical system of the vehicle.

2. The vehicle of claim 1, wherein the external electrical load is a battery having a capacity sufficient to absorb the electrical energy produced by sulfur removal.

3. The vehicle of claim 1, wherein the controller is further configured to monitor the exhaust gas flow to determine when to end sulfur removal and when to alternate rich and non-rich flows.

4. A hybrid vehicle system for removing sulfur from a lean NOx trap, comprising:
   a controller configured to receive data indicative of required deSOx from sensors monitoring exhaust gas, operate an electrical machine as a generator to load a vehicle engine when the vehicle is stationary, and control an engine torque demand to produce a stoichiometrically rich exhaust gas flow to the NOx trap; and
   an electrical load for absorbing energy produced by the electrical machine.

5. The system of claim 4, wherein the controller is further configured to monitor the exhaust gas flow to determine when to end deSOx and when to alternate rich and non-rich flows.

6. The system of claim 4, wherein the controller is an external electronic controller for connecting to an electrical system of a vehicle.

7. A mild hybrid vehicle system comprising:
   a controller configured to, in response to data indicative of required deSOx from exhaust gas monitoring sensors and loading a vehicle engine by an electrical machine as a generator, increase an engine torque demand to produce a stoichiometrically rich exhaust gas flow to a lean NOx trap to remove sulfur; and
   an external battery configured to absorb electrical energy produced by the electrical machine.

8. The mild hybrid vehicle system of claim 7, further comprising a vehicle electrical system controlled by the controller and connected to the external battery.

9. The mild hybrid vehicle system of claim 7, further comprising an external controller configured to operate the electrical machine to load the vehicle engine while the vehicle is stationary.

10. The mild hybrid vehicle system of claim 7, wherein the external battery has a capacity sufficient to absorb the electrical energy produced by the electrical machine during sulfur removal.

11. The mild hybrid vehicle system of claim 7, wherein the controller is further configured to monitor the exhaust gas flow composition from sensors to determine when deSOx is required, when to end deSOx, and when to alternate rich and non-rich flows.

* * * * *